July 9, 1929.  W. E. BOCK  1,720,029
APPARATUS AND METHOD FOR MANUFACTURING GLASSWARE
Filed Jan. 9, 1922  3 Sheets-Sheet 3
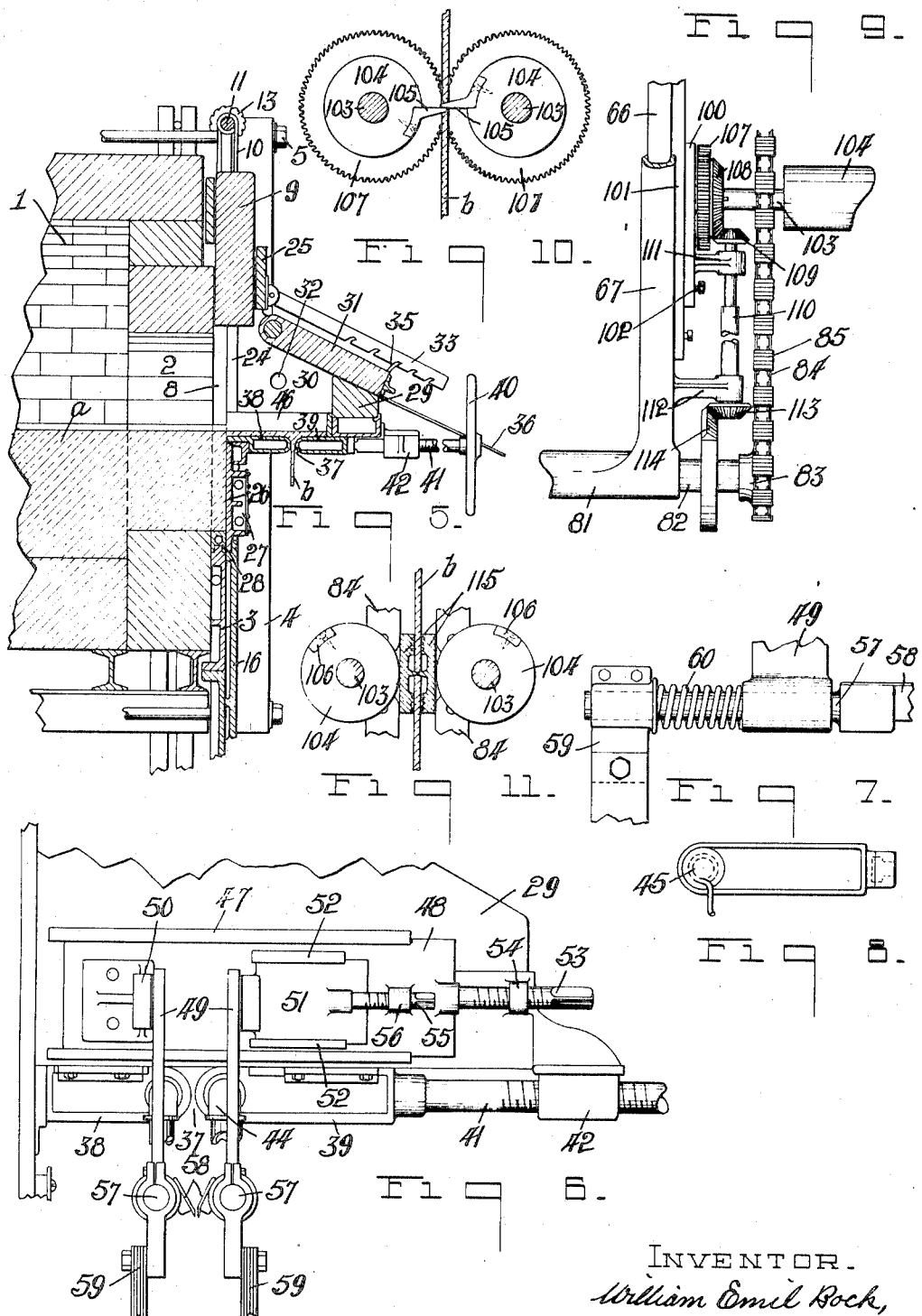

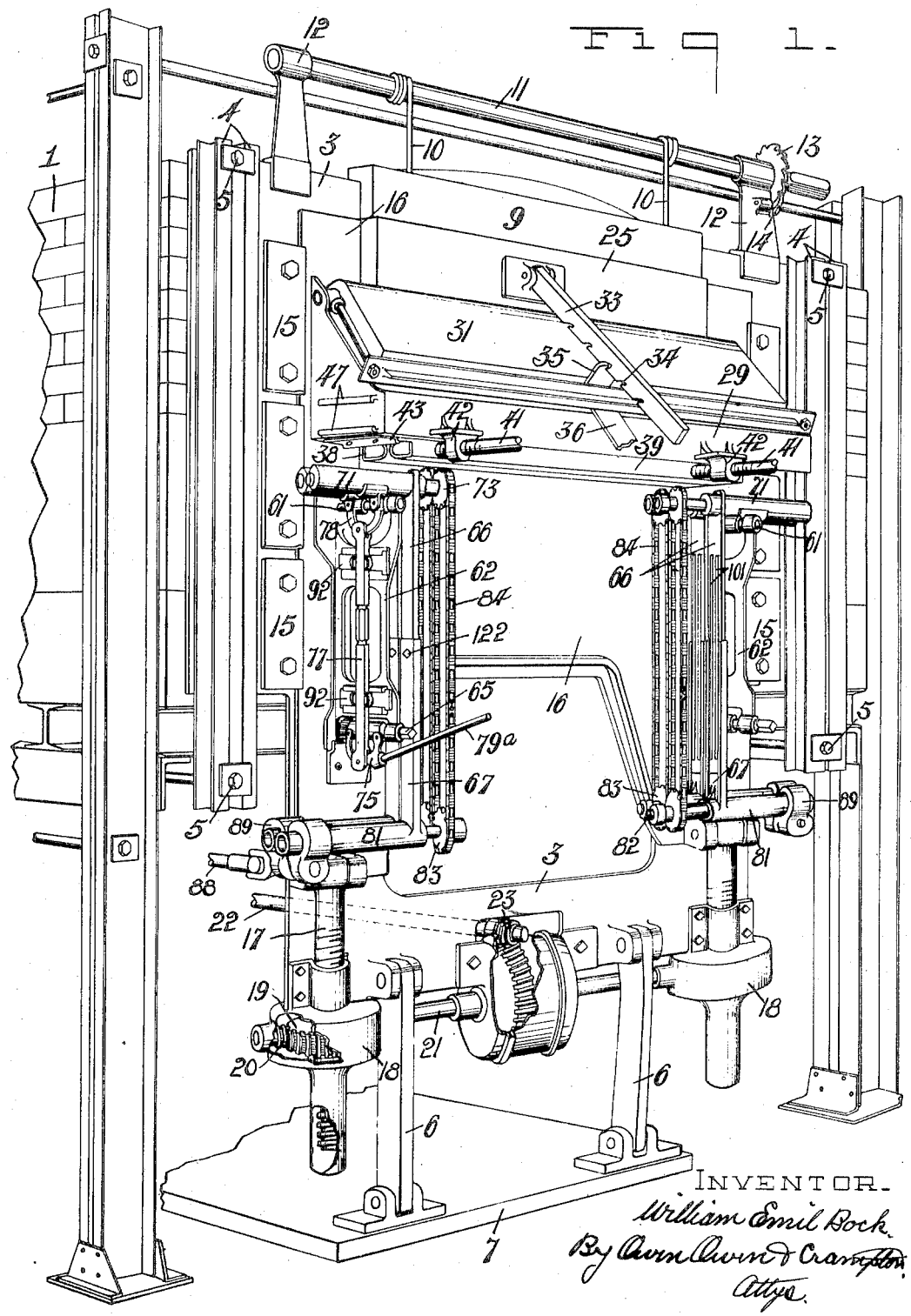

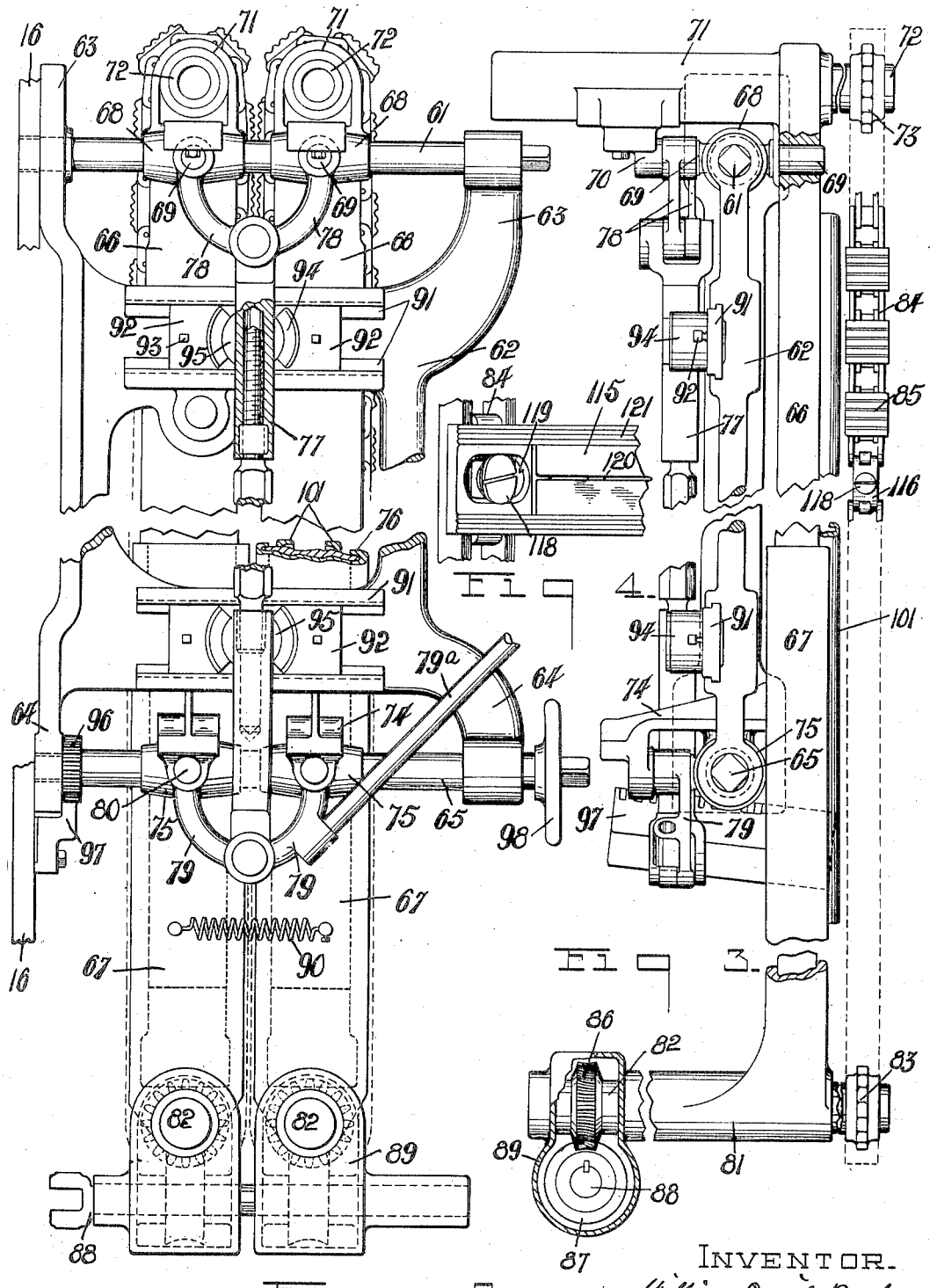

Patented July 9, 1929.

1,720,029

UNITED STATES PATENT OFFICE.

WILLIAM EMIL BOCK, OF EAGLE POINT COLONY, OHIO, ASSIGNOR TO ERIE GLASS COMPANY, OF TOLEDO, OHIO, A CORPORATION OF DELAWARE.

APPARATUS AND METHOD FOR MANUFACTURING GLASSWARE.

Application filed January 9, 1922. Serial No. 527,872.

This invention relates to the manufacture of glassware and particularly to the continuous formation of sheet glass.

The primary object of the invention is the production of continuous sheet glass in a rapid, efficient and economical manner.

Another object of the invention is the provision of simple and efficient width maintaining means for forming a sheet, which means is operable to apply a transverse stretching stress to the sheet during a predetermined portion of the formative stage of its movement.

A further object of the invention is the provision of means for controlling the discharge of molten glass from a source of supply, which means is adjustable to vary the depth of glass therein with relation to the level of glass in the source of supply or to lower the means in accordance with the lowering of the glass level in the source of glass supply by the discharge of glass therefrom.

Further objects and advantages of the invention will be apparent from the following detailed description thereof.

While the invention in its broader aspects is capable of embodiment in numerous forms, a preferred embodiment thereof is illustrated in the accompanying drawings, in which,—

Fig. 1 is a front fragmentary perspective elevation of a furnace and associated apparatus embodying the invention, with parts broken away and with parts removed. Figs. 2 and 3 are enlarged side and front elevations of a width maintaining unit of the apparatus with parts broken away. Fig. 4 is an enlarged perspective fragmentary view of one of the sheet gripping chains and attached severing bar. Fig. 5 is a central vertical longitudinal section through the front portion of a furnace and associated apparatus embodying the invention, with parts removed. Fig. 6 is an enlarged fragmentary end elevation of the portion of the apparatus from which the glass flows in sheet form, with the electrical heated finishing means attached thereto. Fig. 7 is an enlarged side view of an end portion of one of the electrically heated finishing bars and its manner of mounting, with parts broken away. Fig. 8 is an end view of one of the slab members forming the sheet discharge outlet and equipped with an electrical heating unit. Fig. 9 is a fragmentary front elevation of a portion of one of the width maintaining units with a severing means operatively connected therewith and fragmentarily shown. Fig. 10 is an enlarged cross-section through the severing rolls of the attachment and an interposed sheet. Fig. 11 is a cross section through the severing rolls with the severing members removed and severing bars substituted therefor and in the act of severing a sheet.

Referring to the drawings, 1 designates a source of molten glass supply and preferably comprises a refining tank or chamber having communication with a melting tank or furnace from which the supply of molten glass $a$ is received. The tank 1 has an opening 2 in its front, the bottom of which is preferably considerably below the normal flowing level of the glass to maintain a considerable depth of glass therein.

The tank 1 is provided with a front plate 3 rigidly secured thereto, in the present instance, by a set of vertical beams 4 disposed at the outer side of the plate adjacent to each side edge thereof and held to the tank structure by bolts 5. The plate 3 is of sufficient width to extend a considerable distance beyond each side of the tank opening 2 and in depth extends from the top of the tank 1 a distance below the same. Links 6 connect the bottom portion of the plate 3 to a base plate 7 and assist in supporting the plate in rigid relation to the tank. The plate 3 is provided with an opening 8 (Fig. 5), which in width is coextensive with the width of the tank opening 2 and in depth extends from the bottom of the tank opening to the top edge of the plate.

A gate 9 is suspended in the plate opening 8 on cables 10 for vertical movements therein, the cables winding on an overhead shaft 11 journaled in bearings 12 rising from the upper end of the plate 3. The shaft at one end is adapted to receive a crank to facilitate turning thereof and is provided with a ratchet-wheel 13, which engages with a pawl 14 carried by one of the bearings 12 to prevent back turning of the shaft except when the pawl is released from the ratchet-wheel.

The plate 3 is provided at opposite sides of its opening 8 with vertical guides 15, which engage the side edges of a vertically adjustable front plate 16, which extends from near the top of the plate 3 to near the bottom thereof. The front plate 16 is supported at its bottom near each side edge by a vertical shaft 17, which is pivotally connected at its upper end to the plate and extends therefrom down into a housing 18 carried by the bottom edge portion of the stationary plate 3. Each shaft 17 is threaded through a worm-wheel 19 mounted in the case 18 and the wheel is in mesh with and driven by a worm 20 on a cross-shaft 21, which shaft also carries a worm for engaging the worm-wheel of the other shaft 17. A shaft 22, which may receive its power from any suitable source, has worm-wheel connection 23 with the shaft 21 to drive the same in either direction. It is thus evident that a turning of the shaft 21 in one direction or the other will impart raising or lowering adjustment to the shafts 17 and a corresponding adjusting movement to the plate 16.

The plate 16 has an opening 24 in its upper portion in register with and substantially coextensive in width to the frame plate opening 8. The bottom of the opening 24 is preferably disposed above the bottom of the opening 8 to maintain a desired depth of molten glass $a$ within the openings 2 and 8, as shown. The opening 24 terminates at its top below the top of the plate 16 to form a cross-piece 25, which is forwardly offset from the plate 16 and forms a front guide for the gate 9, said gate being of greater thickness than the combined thickness of the plates 3 and 16, as shown in Fig. 5. The portion of the plate 16 which is in advance of the tank opening 2, and which therefore has contact with the molten glass, preferably comprises a section or part 26 (Fig. 5), which is separable from the plate 16 and composed of a metal suitable to withstand the deteriorating chemical action which molten glass has on ordinary metals. The metal preferably employed for this purpose is nickel chromium alloy, it being found that such metal is highly efficient for use in this connection. If desired the part 26 or portion of the plate 16 having contact with the molten glass may be provided with a temperature control chamber 27. It is also preferable to provide the edge portion of the frame plate 3, which forms the portion of the wall of the opening 8 having direct contact with the molten glass, with a similar metal to that of the part 26, as shown at 28 (Fig. 5). This liner member may have a temperature control passage therethrough.

The opening 24 is enclosed at its outer side by a housing 29, forming a spout or forehearth which may constitute a refining or tempering chamber 30, the top of which is closed by a lid or temperature regulating damper 31, which is pivoted to adapt it to be raised any desired extent to permit the escape of highly heated gases from the chamber or to admit cool air thereto from the outside. 32 designates a burner opening, one or more of which is provided in each end of the housing 29. A latch bar 33 pivotally projects from the cross-piece 25 of the plate 16 and has a series of notches 34 in its lower edge for engagement with a catch finger 35 fixed to the forward edge of the lid 31, thereby holding the lid in the desired open position. An arm 36 projects forward from the lid 31 to accessible position in front of the apparatus to facilitate a raising or lowering of the lid.

The housing 29 is fixed to the plate 16 for movements therewith and has its bottom flush with the bottom of the opening 24 and provided with a narrow discharge slot 37 through which molten glass is discharged from the tempering chamber in the form of a sheet $b$. The bottom of such chamber is preferably so disposed with respect to the surface line of the molten glass in the tank 1 that only a relatively thin stream of glass is permitted to flow therefrom over the chamber bottom, as illustrated in Fig. 5, thereby rendering the glass in the chamber more quickly susceptible to a tempering action. The bottom of the chamber 30 is shown in the present instance as formed of two metallic bottom members 38 and 39, which cooperate to form the slot 37, the latter member being mounted for adjustment toward and away from the part 38 to permit a variance in the width of the slot, or a complete closing of the slot when it is desired to stop the flow of glass from the chamber. The movement of the bottom member 39 is controlled by the turning of a pair of handwheels 40 carried by shafts 41, threaded through bearings 42 and connected at their inner ends to adjacent end portions of the movable bottom member 39. The bearings 42 are fixed to the lower forward edge portion of the housing 29. It is preferable to secure both bottom members 38 and 39 to the housing 29 by end guides 43 (Fig. 1), which engage end portions of the bottom members. This permits an adjustment of the bottom member 39 toward and away from its companion and permits both bottom members to be easily and quickly removed from the housing for the purpose of substitution or repair. The bottom members 38 and 39 are composed of nickel chromium alloy which will withstand the chemical action of molten glass, and are preferably hollow to provide for receiving temperature controlling means. In Fig. 6 the members 38 and 39 are shown as having cooling connection 44, and in Fig. 8 one of the members is shown as having an electric heating element 45 disposed therein. The lower interior edge portion of the ends and front side of the housing 29 is preferably lined with metal 46 to a distance above the normal level of the glass in the housing, such metal being of a nature to withstand the deteriorating action of molten glass thereon.

The housing 29 is provided at each end near its lower edge with a pair of vertically spaced guide ribs 47 between which a plate 48 may be mounted for longitudinal adjustment transverse to the discharge slot 37. Two bars 49 are suspended from each plate 48, one being insulatingly connected to a fixed boss or arm 50 on the plate and the other, or forward bar, being insulatingly fixed to a plate 51 mounted between guides 52 on the face of the plate 48 for longitudinal adjustment relative thereto. The plate 48 has an adjusting screw 53 projecting from its outer end through a threaded boss 54 on the housing 29, and the plate 51 has a screw 55 projecting therefrom through a threaded boss 56 on the plate 48. A shaft member 57 is mounted for longitudinal sliding movements in the lower end of each bar 49 and is connected to the companion bar 49 at the opposite end of the housing 29 by a comparatively thin flexible metallic strip 58. The strips 58, which are two in number, are disposed at opposite sides of a sheet of glass *b* flowing from the housing slot 37 and are preferably downwardly and inwardly inclined to adapt them to have contact at their lower edge portions with the respective sides of the sheet. The edges of the strips which have contact with the sheet are preferably sharp or narrow. The strips are intended to be electrically heated to serve either as thickness gauging means for the glass sheet or to impart a surface finish to the sheet. For this purpose the strips 58 are of suitable material to offer a high resistance to the passage of an electric current therethrough and also to withstand the chemical action of molten glass thereon, the material preferably used for such purpose being an alloy preferably composed of nickel chromium or nickel manganese. The shafts 57 serve as electrical conductors for the strips 58, and each has an electrical conductor lead 59 clamped to its outer end. A coiled expansion spring 60 is mounted on each shaft 57 between the respective lead clamp and the suspending bar 48, thereby causing a continual outward pressure to be exerted on the shafts 57 relative to their suspending bars 49 so as to maintain the flexible heating strips 58 taut and their edges in true parallel relation. It is evident that the plates 48 and the parts carried thereby, including the heating strips 58, may be applied to or removed as a unit from the housing 29, depending on whether or not it is desired to gauge or heat finish the surfaces of the sheet *b* after flowing from the slot 37.

A shaft 61 is carried by and projects forward from the movable front plate 16 of the tank a short distance below the bottom plate of the housing 29 adjacent to each end thereof, and each shaft has a frame 62 suspended therefrom for swinging movements toward and away from each other transversely of the tank. The frame 62 has at its upper end a pair of spaced yoke arms 63 mounted on the shaft 61, and has at its lower end a pair of spaced yoke arms 64 in which a shaft 65 is journaled in parallel relation to the shaft 61.

Two sets of frame members 66 and 67, with the members of each set engaged for relative sliding movements, are disposed at the inner side of each frame 62, the frame members 66 being carried by the shaft 61 for adjustment longitudinally of the shaft and transverse to each other, and the frame members 67 being carried by the shaft 65 for sliding movements longitudinally thereof. The bearing means for each member 66 comprises a bearing sleeve 68 slidingly mounted on the shaft 61 and having cross-arms 69 projecting from opposite sides thereof, with one fitting in an opening in the member 66 and the other projecting into a bearing bracket 70 depending from the bottom of an elongated bearing-head 71, provided at the upper end of the member 66 and projecting over the shaft 61. A shaft 72 is mounted in the bearing-head 71 and projects from the inner end thereof to adapt it to carry a sprocket wheel 73 at such end. The lower member 67 of each set has a bracket arm 74 projecting from its outer side over the shaft 65 and carrying a sleeve 75, which is mounted on the shaft 65 for movements longitudinally thereof. Each frame member 67 is provided at its inner side edges with guide flanges 76 for engaging around the respective edges of the upper member 66 to retain the members of a set in longitudinal sliding engagement one with the other.

A connecting bar 77, having a turnbuckle or other suitable adjusting feature, is disposed at the outer side of each frame 62 and is connected at its upper end to the respective bearing sleeves 68 by a pair of toggle-arms 78, and is connected at its lower end to the respective sleeves 75 by a pair of toggle-arms 79. The toggle-arms 78 are pivotally mounted at their outer ends on the outer end studs 69 of the bearing sleeves 68, and the outer ends of the toggle-arms 79 are pivotally mounted on studs 80 projecting from the outer sides of the bearing sleeves 75. The studs 80 project outward beyond the toggles 79 and into depending bearing portions at the outer ends of the brackets 74. It is evident that a raising of the connecting bar 77 from its lowered position shown in Fig. 2, will effect a straightening out of the toggle-arms and a consequent separating movement of the bearing sleeves connected thereby and corresponding outward movement of the sets of frame members 66 and 67, and vice versa. An operating handle 79ᵃ projects from one of the toggle-arms 79.

The lower end of each frame member 67 is provided with an elongated bearing 81 extending outward from the member transversely of the shaft 65 and below the same. Each shaft projects at one end beyond the inner side of the respective bearing member 67 and carries a sprocket-wheel 83 at such end. Each set of frame members 66 and 67 has a sprocket-chain 84 associated therewith and connecting and guided by the upper and lower sprocket wheels 73 and 83 of the set, with the inner flight of the chain of one set of frame members facing and adapted to cooperate with the inner flight of the chain of the other set of frame members to grip the adjacent edge of the sheet b therebetween as such sheet passes down from the discharge slot 37 of the furnace. To facilitate such gripping action the chains are provided at intervals with gripping blocks 85, which are preferably corrugated or otherwise roughened on their outer or gripping faces. These chains are intended to serve as width maintaining means for the sheet and may also, if desired, be employed to regulate the speed of flow of the sheet from the discharge slot by supporting the sheet so that its weight will not tend to accelerate the flowing action.

The chains 84 are driven from the shafts 82, each of which is provided with a worm-wheel 86 in mesh with a drive-worm 87 on a drive shaft 88. The shaft 88 has two universally jointed sections, one of which is mounted in housings 89 carried by the bearings 81 and enclosing the gears 86 and 87. The section of the shaft 88 which extends through the housings 89 has the worms 87 splined thereon to permit a sliding adjustment of the worms and housings thereon without effecting the driving connection between the shafts and worms. The shaft 88 extends to any suitable source of power and is intended to be driven at a speed to suit the speed of movement desired for the sheet gripping chains 84. A coiled contractile spring 90 connects the two members 67 of adjoining sets and resists a relative outward movement thereof.

Each yoke frame 62 is provided near its upper and lower ends with sets of horizontal guides 91, which are parallel to the shafts 61 and 65 and have blocks 92 mounted for longitudinal adjustment therein and secured in adjusted position by set screws 93. The blocks 92 of a set are disposed at opposite sides of the connecting bar 77 and each has a bearing boss 94 projecting outward therefrom at the respective side of the bar 77 and adapted to hold a bearing block 95 in engagement with the adjacent side of the bar. These bearing blocks serve to guide the vertical movements of the bars 77 and hold the feed chain carrying units in proper adjustment axially of the shafts 61 and 65. It is evident that each feed chain unit is provided in gripping relation to each edge portion of a sheet b.

Each frame 62 is adapted to be swung transversely of the furnace or toward and away from the other member 62 on the shaft 61, thereby permitting an adjustment of each set of edge gripping chains so as to dispose them in true vertical position parallel with the longitudinal center line of the sheet b being formed or to dispose them at an angle to such center line. To facilitate such adjustment of the frames 62 the lower shaft 65 of each is adapted to rotate in the yoke arm 64 of the frame and in the bearing sleeves 75 and has a pinion 96 fixed to its inner end portion for mesh with a rack-bar 97 fixed to the movable front plate 16 of the furnace and extending outward and upward around the end of the inner yoke arm 64. The outer end of the shaft 65 carries a hand-wheel 98 to facilitate a turning thereof.

It is evident that the two units, which are carried by the movable plate 16 at opposite side edges of a sheet flowing down from the furnace discharge opening 37, cooperate to form width maintaining and feeding means for the sheet and that the units are adjustable relative to each other, both for swinging movements transverse to the sheet and for opposed reciprocatory movements toward and away from the plate 16, and that the cooperating sheet gripping chains of each unit are relatively adjustable toward and away from each other to suit the thickness of a sheet being acted on or for other purposes.

If it is desired to sever a sheet into sections as it advances from the discharge slot 37, suitable attachments may be used in connection with the sheet feeding and width maintaining means for such purpose. Such attachment may include a plate 100 mounted for adjusting movements in vertical guides 101 provided on the inner side of each frame member 66 and projecting outward between the guide flanges 76 of the respective frame member 67 and secured in adjusted position to the member 66 by a setscrew 102, or in any other suitable manner. A roller shaft 103 connects and is journaled at its ends in respective plates 100 carried by the opposed feeding and width maintaining units, thereby providing two shafts 103, one at each of opposite sides of a sheet and each provided with a roller 104. The rollers 104 are spaced from the sheet b so as not to have surface contact therewith and each is provided with a sheet severing bar 105 which at a predetermined point in a revolution of the roll is adapted to lap and cooperate with the bar 105 of the opposing roll to sever the sheet as shown in Fig. 10. The bars 105 are removable from the rolls 104, and when removed the cavities in which their base portions were mounted may be filled with filler-strips 106 (Fig. 11). Each shaft 103 is provided at one end with a spur-gear 107, which meshes with a companion spur-gear on the other shaft to cause the two shafts to rotate together at uniform speeds. One of the shafts 103 is provided with a bevel gear 108 in mesh with a bevel gear 109 on the upper end of a vertically disposed shaft 110. This shaft comprises two telescoped sections in feathered engagement to adapt them for longitudinal adjustment and to cause one to drive the other. The upper section is journaled in a bearing arm 111 projecting from the lower end portion of the associated plate 100, and the other section is journaled in a bearing arm 112 projecting from the lower end of the associated frame member 67. The lower end of the shaft 110 carries a bevel gear 113 in mesh with a segmental bevel gear 114 on the shaft 82, which latter gear, during a predetermined portion of each revolution, engages and imparts rotation to the gear 113. The driving of the rolls 104 from the shaft 82 is so timed that the rolls 104 when driven will be rotated at the speed of movement of the sheet $b$ so that the shear bars 105 of the rolls will cause neither a stretching nor buckling of the sheet when shearing the same, and the idle period of the gear 114 is of suitable length to cooperate with the toothed portion of such gear to permit the feeding of a predetermined length of the sheet before each severing action. The plates 100 are adjustable longitudinal of the frame member 66 to suit the point below the discharge slot 39 at which it may be desired to sever the sheet.

Another form of severing means which is preferably employed consists in mounting several bars 115 (Figs. 4 and 11) at intervals on the chains 84 to operate in pairs on the sheet $b$ to sever the same into sections. A shallow link 116 (Fig. 3) is substituted for the gripping block link 85 of the chain so that when the end of a bar 115 is placed against the outer side of a link 116 the outer surface of the bar will be in a plane with the gripping surfaces of the blocks 85. Each end of a bar 115 is secured to the respective link 116 by a screw 118, which projects through a slot 119 in the bar and threads into the link 116. The screws 118 have a free sliding fit in the slots 119 so that the screws may move outward or inward with respect to the bars when the bars are traversing either flight of the respective belts when the belts are set on an incline to a vertical or at an angle to the line of drawing of the sheet. The bars 115 serve as combination sheet severing and gripping bars, and for this purpose are provided at their outer sides with a longitudinally extending central severing rib 120 and at the side edge portions of their outer sides with corrugated gripping portions 121. It is thus evident that the sheet sections are gripped at their ends entirely across the sheet by the gripping surfaces 121 and held thereby until the sections have passed downward beyond the chains. It is of course understood that the bars 115 act in pairs with the different bars of a pair carried by different chains 84 at opposite sides of the sheet $b$. If the severing bars 115 are employed the severing bars 105 are removed from the rolls 104 and such rolls then act on the bars 115, as such bars pass between the rolls, to apply a sheet severing pressure on the bars, as shown in Fig. 11. If desired the sheet edge gripping action of the chains 84 may be eliminated when the bars 115 are used.

In the present embodiment of the invention the severing bars 105 of the rolls 104 and the severing ribs 120 of the bars 115 terminate at their ends short of or adjacent to the sheet edge gripping chains 84 thereby leaving a continuous selvage edge along the edges of the sheet which connect the severed body portions of the sheet and are later broken in two in line with the slits formed by the bars 105 or 115. If desired, however, the severing or slitting of the sheet may be from edge to edge thereof.

It is evident that in the use of an apparatus embodying the invention that the molten glass flows into the housing or tempering chamber 30 and in a properly regulated stream therefrom through the bottom discharge slot 37, the stream forming the sheet $b$. The thickness of the sheet is regulated by an adjustment of the movable bottom plate 39 which is controlled by a turning of the hand screws 41 and by the depth of glass in the chamber 30. It is apparent that if desired the slot 37 may form an opening of greater width than the thickness of the sheet and over one edge wall of which the molten glass may flow in a properly regulated stream to form the sheet $b$. At a short distance below the bottom discharge slot 37, the edges of the sheet $b$ are gripped between sets of chains 84 which are driven at a speed consistent with the speed of flow of the sheet $b$ and serve to prevent a sagging in or narrowing of the sheet until it has been sufficiently cooled to maintain its shape. The chains 84 in addition to serving as width maintaining means for the sheet may also serve to regulate the feed of the sheet, as a speeding up of the chains relative to the natural gravity flow of the glass from the chamber 30 will tend to accelerate such flow, and a retarding or slowing down of the speed of movement of the chains will cause the chains to support or partially support the sheet $b$ so that the speed of flow or advancing thereof from the chamber 30 will be retarded. The opposing chains 84 are moved inward and outward in opposed relation to engage and release a sheet by a movement of the handles 79ª, which are connected to the lower set of toggle links 79 of each unit and are connected through the bars 77 to the upper toggle links 78, a downward movement of the bars 79ª from elevated positions effecting an outward separating movement of the sleeves 68 and 75 of each pair and a consequent separating of the opposed chains 84, while an upward movement of the handles 79ª from their lowered positions will effect inward movements of the sleeves of the different pairs and consequent inward sheet engaging movements of the chains. The sheet edge engaging units may be bodily adjusted inward or outward relative to the furnace front by an inward or outward adjustment of the slide plates 92, which hold side bearings 95 in engagement with the bar 77 of the units. This adjustment enables a proper placing of the units to suit the line of flow of a sheet $b$. If it is desired to exert a transverse progressive stretching action on a sheet to increase its width, the sheet edge gripping units are bodily swung outwardly on the respective shafts 61 to cause the chains 84 to assume a line of draft which is downwardly and outwardly angled with respect to the center longitudinal line of the sheet. This adjustment is accomplished by turning the shafts 65 to cause pinions 96 to travel inward or outward on the respective racks 97. If it is desired to take up slack in the chains 84 or to lengthen or shorten the same by inserting links therein or removing links therefrom, the frame members 66 and 67 may be slidingly adjusted for such purpose after loosening the set screws 122 (Fig. 1), which secure the frame members in adjusted position. As the sheet $b$ flows down from the slot 37 it may be passed through the electrically heated surface finishing bars 58 which in the present instance are detachably suspended from the ends of the housing 29 and may engage opposite surfaces of the sheet. This heating means may also serve as a thickness gauging means for the sheet if desired. If a substantially constant level of molten glass is maintained in the furnace and it is desired to vary the depth of molten glass in the tempering chamber 30 the front plate 16, with the different means carried thereby, may be vertically adjusted by transmitting power to the shaft 21 through the shaft 22 and thence to the worm-wheels 19, which are held against axial movements and are threaded on the rod 17 supporting the plate 16. Should it be desired to discharge the glass from the furnace without continually supplying fresh glass to the same to maintain a substantially constant level of glass in the furnace, the adjusting means for the plate 16 is driven at a speed which is so proportioned with respect to the flowing off speed of the molten glass that the plate and attached parts are lowered at substantially the same speed as the lowering of the glass level in the furnace, thereby maintaining an approximately constant depth of glass in the chamber 30 during the discharging operation. A transverse slotting of the sheet $b$ to sever it into successive sections of equal length, or to partially sever it, may be accomplished by the opposed sets of severing bars 115, which are carried in pairs by the chains 84 and pass between and have a severing pressure imparted thereto by the rolls 104; or the severing may be accomplished by co-acting severing bars 105 carried by said rolls. The upper and lower edges of the severing bars 115 grip the sheet above and below the point of severing and prevent any tendency of the sheet to sag intermediate its edges until the glass has become sufficiently chilled to maintain its shape. The rolls 104 are driven in unison and at a predetermined speed from one of the shafts 82 and are vertically adjustable to vary the distance from the discharge slot 37 at which it may be desired to slit or sever the sheet, such adjustment being accomplished by a raising or lowering of the plates 100 carrying the rolls.

It is apparent that I have provided a glass tempering house from which a stream of molten glass may flow in sheet form, and associated means for regulating the feeding of the sheet and to maintain the width of the same together with surface finishing means for the sheet, which several parts are vertically adjustable as a unit with respect to the source of molten glass supply; and also that the units, two in number, are adjustable in various respects to suit the thickness of the sheet, the position of flow of the same from the tempering chamber, and the amount of transverse stretching stress applied to the sheet to maintain its width.

I wish it understood that while I have particularly described a particular combination and arrangement of elements, such combination and arrangement may be varied in numerous respects without departing from the spirit of the claims, and that the arrangement and forms of the elements of the various sub-combinations may also be varied in numerous respects without departing from the spirit of the claims.

Having thus described my invention, what I claim as new, and desire to secure by Letters Patent, is,—

1. The combination with the outlet opening of a furnace or source of molten glass supply, of a forehearth having a bottom discharge opening for the gravity flow of a stream of molten glass therefrom and adapted to receive glass from said outlet opening, said forehearth being vertically adjustable relative to the outlet opening to vary the depth of glass in the forehearth or to compensate for a lowering of the level of the glass in the source.

2. The combination with the outlet opening of a source of molten glass supply, of a plate vertically adjustable with respect to the source of supply and having an opening for registering with the outlet opening of the source, and means carried by the plate and forming a tempering chamber at the outer side of the plate opening and into which molten glass flows from the source of supply, said means having an outlet through which glass flows in sheet form from the chamber.

3. The combination with a furnace having an outlet opening, of a plate secured to the outer side of the furnace and vertically adjustable relative thereto, the plate having an opening in communication with the outlet opening of the furnace, means operable to vertically adjust the plate, and means carried by the plate and forming a tempering chamber in communication with its opening and into which molten glass flows from the furnace, said means forming a discharge outlet from the chamber from which glass flows in regulated stream form.

4. In combination, means containing a quantity of molten glass and having an outlet opening for the glass, means in contact with said first means for vertical adjustment and forming an outlet in communication with the first outlet opening and into which molten glass flows from the first means, said second means having a bottom discharge opening for the gravity flow of a sheet of glass therethrough.

5. In combination, a furnace for containing a quantity of molten glass and having an outlet opening, means forming a tempering chamber without said opening in communication therewith to permit molten glass to flow into the chamber from the furnace, said means being vertically adjustable relative to the furnace to regulate the depth of glass in the chamber and having a bottom discharge slot for the glass together with means to regulate the width of the slot.

6. In combination, means from which molten glass flows by gravity in sheet form, a pair of flexible electrically heated bars disposed at opposite sides of the sheet to surface finish the same, means supporting the bars, and means exerting a longitudinal stretching pull on the bars.

7. In combination, means containing a quantity of molten glass and having an outlet opening, means forming a tempering chamber in communication with the furnace outlet opening and mounted for vertical adjustment to suit the level of the glass in the first means, the bottom of said chamber forming a discharge slot and being adjustable to vary the width of the slot.

8. In combination, a furnace for containing a quantity of molten glass, a housing mounted in embracing relation to said opening and forming a tempering chamber, said housing having a roof gate for temperature regulating purposes and having a discharge opening in its bottom with a side wall of said opening adjustable relative to the other to vary the width of the opening, and means for vertically adjusting the housing relative to the furnace.

9. In combination, means forming a chamber having a discharge opening from which molten glass flows by gravity in sheet form, a pair of transversely spaced flexible crossbars of high electrical resistance metal suspended from the means below the discharge opening at opposite sides of a sheet flowing therefrom and in surface finishing contact therewith, said bars being inclined inwardly and downwardly toward each other and terminating in narrow lower edges, means for exerting a longitudinal tension on the bars, and means connecting said bars in electrical circuit.

10. In combination, means forming a chamber from which molten glass flows in sheet form, a pair of electrically heated bars disposed below said means at opposite sides of a sheet flowing therefrom in contact therewith, suspending means for the bars adjustable to vary the spacing between the bars, the bars having their inner faces downwardly and inwardly inclined and terminating in narrow lower edges.

11. In combination, means to hold a supply of molten glass, a forehearth for receiving glass from said means and from which a glass sheet is formed, a sheet width controlling means, and means carrying said forehearth and width control means as a unit and adjustable relative to said first means.

12. In combination, means from which molten glass flows in sheet form, a yoke mounted adjacent to each side edge of the sheet near the sheet flowing source for swinging adjustment transverse to the sheet, two frames carried by each yoke for adjustment toward and away from each other at an angle to the swinging axis of the yoke, means for imparting adjusting movements to the frames, a set of upper and lower shafts carried by each frame, a sprocket wheel on each shaft, a chain connecting the sprocket wheels of each set and cooperating with the other chain to have prolonged gripping coaction with the adjacent edge of the sheet to serve as width maintaining means therefor, and means for driving one of the shafts of each set.

13. In combination, a furnace containing molten glass having a discharge opening in its front, a plate mounted for vertical adjustment at the front of the furnace and having an opening registering with the discharge opening of the furnace, means carried by the plate without its opening and into which glass flows from the furnace and having an outlet through which glass flows in sheet form, separate width maintaining units carried by the plate at opposite side edges of the sheet and operable to grip the respective edges of the sheet and prevent an inward contracting thereof until the sheet is set, and means for vertically adjusting the plate.

14. In combination, a furnace for molten glass having a discharge outlet in its front, a plate mounted for vertical adjustment at the front of the furnace and having an opening in register with the furnace opening, a housing carried by the plate without its opening and forming a tempering chamber for the glass, the housing having an outlet from which the glass flows in sheet form, a unit carried by the plate at each side edge of the sheet and having chains for prolonged gripping engagement with the sheet, each unit being angularly adjustable transverse to the sheet, means for imparting predetermined feeding movements to the chains of each unit, and means operable to adjust the plate.

15. In combination, a furnace for molten glass having an outlet opening, means forming a chamber in position to receive molten glass from the furnace and having an outlet through which glass flows in sheet form, a pair of sheet edge engaging width maintaining units, one disposed at each side edge of the sheet, and means carrying the first means and width maintaining units and operable to vertically adjust the same in unison.

16. In combination, a furnace having an outlet for molten glass, means forming a chamber into which glass flows from the furnace through its outlet opening and having an outlet through which glass flows in sheet form, a pair of sheet edge engaging width maintaining units, one disposed at each side edge of the sheet, surface finishing means for the sheet, and means carrying said first means, width maintaining units and surface finishing means for vertical adjustment in unison relative to the furnace opening.

17. In combination, means from which molten glass flows in sheet form, a width controlling unit disposed at each side edge of the sheet and having a pair of sheet edge gripping chains, the chains of each unit being angularly adjustable relative to the line of movement of the sheet and being adjustable relative to each other, means for driving the chains in accordance with the movement of the sheet, and sheet severing bars connecting the chains of different units and operable to periodically cooperate in pairs to transversely slit the sheet, the bars having longitudinal sliding connection with the chains.

18. In combination, means from which molten glass flows in sheet form, a width controlling unit disposed at each side edge of the sheet and having a pair of sheet edge gripping chains, the chains of each unit being angularly adjustable relative to the line of movement of the sheet, means for driving the chains in accordance with the movement of the sheet, and sheet severing bars connecting the chains of different units and operable to periodically cooperate in pairs to transversely slit the sheet, the bars having longitudinal sliding connection with the chains, and operable to periodically cooperate in pairs to transversely slit the sheet and to grip the sheet at opposite sides of a slit formed thereby.

19. In combination, a tank for containing molten glass and having an outlet, vertically adjustable forehearth into which glass flows from the tank through said outlet and having a gravity discharge outlet in its bottom portion, and means operable to lower the forehearth in accordance with the lowering of the level of glass in the tank as it flows therefrom.

20. In combination, a tank for containing molten glass, vertically adjustable means forming a discharge outlet from the tank through which the glass flows in sheet form, means operable to lower the first means in accordance with the lowering of the level of glass in the tank as the glass flows therefrom, and means adjustable with the first means and operable to engage and maintain the width of the sheet as it flows from the outlet.

21. In combination, a tank for containing molten glass, vertically adjustable means forming a discharge outlet from the tank through which the glass flows in sheet form, means operable to lower the outlet means in accordance with a lowering of the level of the glass in the tank as it flows therefrom, and means adjustable with the first means for engaging opposite edges of a sheet flowing from the outlet and operable to exert a transverse streching stress thereto.

22. In combination, a tank for containing molten glass and having a discharge opening, means forming a chamber and an outlet passage for controlling the flow of glass in sheet form from the furnace through its opening, means operable to engage the edges of a sheet flowing from the outlet and maintaining the width thereof, means for surface finishing the sheet, and means operable to raise and lower said three former means relative to the discharge opening of the tank.

23. In combination, means from which glass flows in sheet form, means for gripping and holding the sheet edges during a predetermined length of movement of the sheet and adjustable to cause a transverse stretching tension to be applied to the sheet as it advances in engagement with the gripping means, and means periodically operable to transversely slit the sheet while engaged by the gripping means.

24. In combination, a receptacle for molten glass having a discharge opening, and a forehearth having a receiving opening, the glass contacting walls of the receptacle and forehearth about the openings being in sliding contact and faced with high heat resisting metal.

25. In combination, a receptacle for molten glass having a lateral discharge opening, and a vertically adjustable forehearth having a receiving opening, the glass contacting walls of the receptacle and forehearth about the openings being in sliding contact and faced with high heat resisting metal.

26. In combination, a receptacle for molten glass having a lateral discharge opening, a vertically adjustable member over which the glass flows, said member being in sliding contact with the side of said receptacle about said opening and adapted to receive glass through said opening and deliver it in sheet form, the contacting faces of the glass-containing walls of the receptacle and delivering member about said opening being faced with high heat resisting metal that may contact molten glass without discoloring it.

27. In combination, a container for molten glass having a lateral discharge opening, the top of the opening being above the level of the glass, and a horizontal lip member at said opening over which the glass flows under head from the container and in sheet form from such member, said lip member and container being relatively adjustable in a vertical direction to vary the head and thickness of the glass flowing over the member.

28. In combination, a container for molten glass having a lateral discharge opening, the top of the opening being above the level of the glass, and a horizontal lip member at said opening over which the glass flows under head from the container and in sheet form from such member, said lip member and container being relatively adjustable in a vertical direction to vary the head and thickness of the glass flowing over the member, the lip member being of electric resistance material to permit it to be electrically heated by the flow of an electric current therethrough.

29. In combination, a container for molten glass having a lateral discharge opening with its top disposed above the glass level in the container, and means at said opening vertically adjustable to stop or control the quantity of flow of glass from the container and having a portion over and from which the glass flows at least partially under head from the container in regulated sheet form, the contacting surfaces of said container and means being in sliding contact and faced with high heat resisting metal.

30. In an apparatus of the character described, a container for molten glass having a lateral outlet, a horizontal lip member at said opening over which the glass flows under head from the container and in sheet form from such member, said lip member being of chromium alloy adapted to be electrically heated and being vertically adjustable to vary the head of flow of glass from the container, and electrically heated sheet thickness gauging means in outwardly spaced relation to said lip member for engagement with a side of the sheet after leaving the lip member, said gauging means having a member disposed at one side of the sheet and terminating in a thin edge projecting in the direction of movement of the sheet and having gauging contact with the respective sheet side.

31. In combination, a container for molten glass having a lateral discharge opening, a hollow horizontal lip member in said opening over which the glass flows under head from the container and in sheet form from such member, said lip member being of chromium alloy and having a rounded edge over which the glass flows, and electrical means internally of the lip member for heating the same, said lip member and container being relatively adjustable to vary the head and thickness of the glass flowing over the member.

32. In an apparatus of the class described, a container for molten glass having a lateral outlet, spout means at said outlet having a lip over which the glass may flow in sheet form, means for heating the lip so that the glass while in contact therewith will be maintained in an easily flowing state, and means for adjusting the spout means to vary the head of flow of the glass over the lip.

33. In an apparatus of the character described, a container for molten glass having a lateral outlet, a spout means at said outlet vertically adjustable to vary the head of flow of the glass from the container and having an electrically heated nickel chromium alloy lip over which the glass flows from the spout means, and means for adjusting said spout means.

In testimony whereof I have hereunto subscribed my name to this specification.

WILLIAM EMIL BOCK.